July 17 1951    M. UNZEITIG    2,560,999
VEHICLE SPRING SUSPENSION
Filed Feb. 24, 1950

INVENTOR.
MILVOY UNZEITIG
BY
McMorrow, Berman + Davidson
ATTORNEYS

Patented July 17, 1951

2,560,999

UNITED STATES PATENT OFFICE 2,560,999

VEHICLE SPRING SUSPENSION

Milvoy Unzeitig, Cedar Rapids, Iowa

Application February 24, 1950, Serial No. 145,929

1 Claim. (Cl. 267—29)

This invention relates to vehicle spring suspension and more particularly to an auxiliary spring assembly for application to a fatigued vehicle leaf spring to restore the shape and resiliency of the leaf spring.

It is among the objects of the invention to provide an auxiliary spring assembly which can be applied to an existing vehicle leaf spring without modification of the latter to restore the shape of the leaf spring and provide in the spring assembly an additional resiliency sufficient to give to the spring suspension a resiliency equivalent to that of a new leaf spring, which auxiliary spring assembly is fully adjustable so that it can be used to add resiliency in proportion to the loss of resiliency by the leaf spring during use, and which auxiliary leaf spring assembly is simple and durable in construction, economical to manufacture and easy to install in an existing spring suspension.

Other objects and advantages will become apparent from a consideration of the following description and the appended claim in conjunction with the accompanying drawing wherein:

Figure 1:
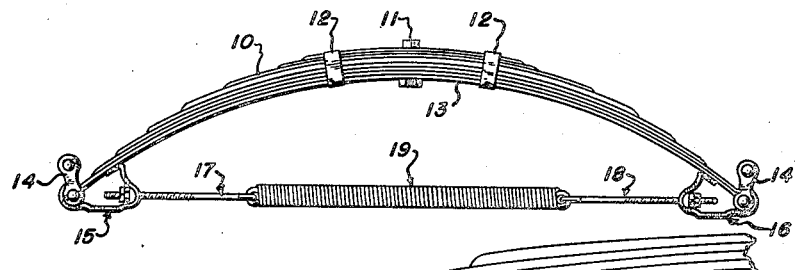
Figure 1 is a side elevation of a vehicle spring suspension including a semielliptical leaf spring and an auxiliary spring assembly illustrative of the invention applied to the leaf spring.

With continued reference to the drawing there is illustrated in Figure 1 a semielliptical, multileaf spring 10 such as is commonly used in the spring suspensions of automotive vehicles, such as automobiles and trucks.

Figure 2:
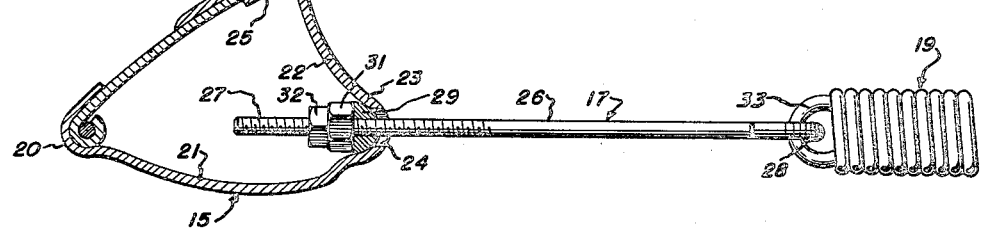
Figure 2 is an elevational view similar to Figure 1 of a fragmentary end portion of the assembly shown in Figure 1, Figure 2 being illustrated on an enlarged scale and with a portion of the spring suspension broken away and shown in cross section to better illustrate the construction thereof.
Figure 3:
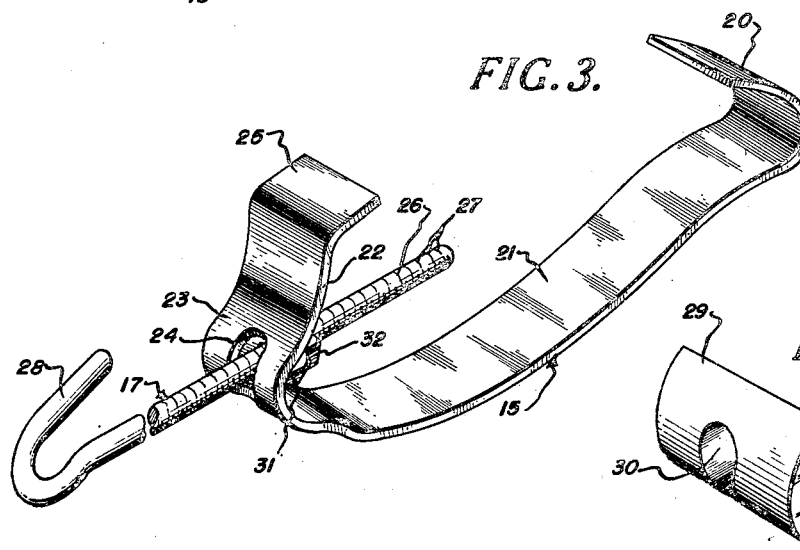
Figure 3 is a perspective view of a hook and bracket assembly constituting a subassembly of the auxiliary spring assembly illustrated in Figures 1 and 2.

By way of example, such semielliptical, multileaf springs are used in Ford and Mercury automobiles up to and including the 1949 models of these automobiles, and in such automobiles are positioned in the upwardly arched condition as illustrated in Figures 1 and 2, transversely of the vehicle frame and substantially parallel to the vehicle axles. Such springs are also used in both downwardly and upwardly arched positions in various other automobiles and trucks.

A bolt 11 extends through the spring leaves at the mid-length location of the spring to secure the leaves together against longitudinal movement relative to each other and suitable clips, as indicated at 12, surround the spring at locations spaced from the center bolt 11. The longest or main leaf 13 of the spring is provided at its ends with cylindrically shaped eyes and these eyes are attached to the vehicle axle or other wheel supported structure by shackles 14 each of which includes a pair of spaced apart pins one of which extends through the corresponding main leaf eye and the other through a shackle bracket attached to the automobile frame or axle and one or more side plates connecting these pins at the opposite ends of the pins.

When these leaf springs are new they support the vehicle frame and body in proper position above the vehicle axles and have sufficient strength so that the frame does not bump on the axles due to road shocks and is properly supported on curves and under other driving conditions. During use, however, the leaf springs tend to lose both their shape and their resiliency so that they become flatter and have less strength for supporting the frame and body of the vehicle. The auxiliary spring assembly of the present invention is applicable to such a weakened leaf spring to restore the shape of the leaf spring to its original condition and add to the spring suspension an amount of resiliency sufficient to restore to the suspension the resiliency of a new leaf spring.

The auxiliary spring assembly comprises, in general, two substantially identical brackets 15 and 16, two hooks 17 and 18 respectively connectible to the brackets 15 and 16, and an elongated, coiled tension spring 19 connected at its respectively opposite ends to the hooks 17 and 18.

As the two brackets and the two hooks and the means connecting the two hooks to the two brackets are substantially identical, a description of only one of each is considered sufficient for the purposes of the present disclosure and the bracket 15, hook 17 and means connecting the hook 17 to the bracket 15 have been selected for the purpose of detailed illustration and description.

The bracket 15 is formed of a length of flat metal stock and has at one end a curved hook formation 20 shaped to fit over the eye at the corresponding end of the main leaf 13 of the leaf spring and extend from the eye a short distance along the outer surface of the main leaf, as is clearly illustrated in Figure 2. An intermediate portion 21 extends from one side of the hook portion 20 and a bracket leg 22 extends from the intermediate portion 21 at the end of the latter opposite the hook in the same direction as that in which the hook extends from the intermediate portion. Adjacent the associated end of the intermediate portion 21 the bracket leg 22 is provided with an outwardly extending, cylindrically curved formation 23 within which is provided an elongated slot or aperture 24 extending longitudinally of the bracket leg. At its end opposite the intermediate portion 21 the bracket leg 22 is provided with an angularly disposed portion 25 which extends from the leg 22 toward the hook 20 and bears against the inner surface of the main leaf 13 of the leaf spring when the hook 20 is associated with the main leaf eye.

Figure 4:
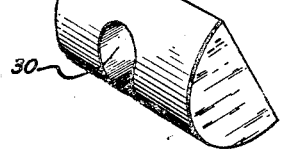
Figure 4 is a perspective view of an abutment block constituting a component of the auxiliary spring assembly.

The hook 17 comprises an elongated, straight shank 26 having external screw threads 27 extending from one end thereof and having a curved hook formation 28 at its opposite end. The screw threaded portion of the shank 26 is inserted through the elongated aperture 24 in the bracket leg and through an abutment block 29, particularly illustrated in Figure 4. This abutment block is a solid piece of suitable material, such as metal, of semicylindrical shape having an elongated opening or aperture 30 therethrough substantially at its mid-length location.

The curved side of the abutment block 29 fits into the curvature of the curved formation 23 of the leg 22 and the hook shank 26 extends through the aperture 30 in the abutment block. A nut 31 is threaded onto the screw threaded portion of the hook shank 26 and bears against the flat side of the abutment block 29 and a lock nut 32 is threaded onto the hook shank and bears against the side of the nut 31 opposite the abutment block to lock the nut 31 in adjusted position on the hook shank.

The spring 19 is a coiled tension spring provided at each end with a rounded hook or loop 33 which is hooked into the hook formation 28 of the corresponding hook 17 or 18 to connect the spring 19 between the hooks 17 and 18.

In assembling the auxiliary spring assembly onto the existing leaf spring the nuts 31 are positioned so that the assembly has a length substantially equal to that of the leaf spring in its existing condition. The brackets are then applied to the ends of the leaf spring and the tension spring 19 connected between the hooks 17 and 18, this spring preferably being slightly stretched in applying it to the hooks so that when released it will exert a slight tension on the hooks and brackets to hold the brackets in place on the ends of the leaf spring. The nuts 31 are then threaded along the shanks of the hooks 17 and 18 until the leaf spring has been brought to its original shape by the pull of the tension spring 19 on the opposite ends of the leaf spring. When this condition is reached the lock nuts are threaded into engagement with the nuts 31 to secure the auxiliary spring assembly in properly adjusted condition.

If any sag should recur in the leaf spring after the auxiliary spring assembly has been applied the auxiliary spring can be again tightened to bring the leaf spring back to its proper shape.

The semicylindrical abutments 29 and elongated slots 24 permit the brackets 15 and 16 to turn relative to the shanks of the hooks 17 and 18 as the leaf spring flexes and the pressure of the abutment portion 25 of each bracket leg against the under side of the leaf spring applies a force between the leaf spring and the shackles 14 which tends to eliminate rattling and vibration of the spring.

The invention may be embodied in other specific forms without departing from the spirit or essential characteristics thereof. The present embodiment is, therefore, to be considered in all respects as illustrative and not restrictive, the scope of the invention being indicated by the appended claim rather than by the foregoing description, and all changes which come within the meaning and range of equivalency of the claim are, therefore, intended to be embraced therein.

What is claimed is:

In combination with a semielliptical vehicle leaf spring having shackle bolt receiving formations disposed one at each end thereof, means for increasing the bow of said leaf spring comprising a pair of brackets applied one to each end of said spring and each comprising a length of flat metal stock having at one end a rounded hook formation fitting over the corresponding shackle bolt receiving formation and having intermediate its length a rounded portion provided with an elongated aperture and a leg projecting from said rounded portion at an angle to the portion of said bracket between said hook formation and said rounded portion and engaging the under side of said leaf spring at a location spaced from the corresponding shackle bolt receiving formation, partly cylindrical abutment blocks disposed one in the rounded portion of each bracket and each having an aperture therethrough, hooks having screw threaded shanks extending one through the aperture in each bracket and the aperture in the associated abutment block, nuts adjustably threaded onto said shanks at the sides of said abutment blocks remote from the rounded portions of the corresponding brackets, and a coiled tension spring disposed between said hooks and connected at its ends to the latter to apply a bow increasing force to the ends of said leaf spring, said bearing blocks providing freedom of swinging movement of said hooks relative to said brackets during flexing of said leaf spring.

MILVOY UNZEITIG.

REFERENCES CITED

The following references are of record in the file of this patent:

UNITED STATES PATENTS

| Number | Name | Date |
|---|---|---|
| 246,479 | Doble | Aug. 30, 1881 |
| 365,968 | Chase | July 5, 1887 |
| 1,124,964 | Smith | Jan. 12, 1915 |
| 1,319,736 | Volpe | Oct. 28, 1919 |
| 2,457,243 | Kucera | Dec. 28, 1948 |

FOREIGN PATENTS

| Number | Country | Date |
|---|---|---|
| 244,818 | Great Britain | Dec. 21, 1925 |